United States Patent
Suzuki et al.

(10) Patent No.: US 10,283,773 B2
(45) Date of Patent: May 7, 2019

(54) ACTIVE MATERIAL, METHOD OF MANUFACTURING ACTIVE MATERIAL, AND LITHIUM-ION SECONDARY BATTERY

(71) Applicant: TDK CORPORATION, Tokyo (JP)

(72) Inventors: Hisashi Suzuki, Tokyo (JP); Keitaro Otsuki, Tokyo (JP); Masayoshi Hirano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/906,555

(22) Filed: Feb. 27, 2018

(65) Prior Publication Data

US 2018/0190988 A1 Jul. 5, 2018

Related U.S. Application Data (63) Continuation of application No. 12/784,893, filed on May 21, 2010, now abandoned.

(30) Foreign Application Priority Data

May 28, 2009 (JP) ................................. 2009-129368
Apr. 27, 2010 (JP) ................................. 2010-102135

(51) Int. Cl.
*H01M 4/58* (2010.01)
*H01M 10/0525* (2010.01)

(52) U.S. Cl.
CPC ..... *H01M 4/5825* (2013.01); *H01M 10/0525* (2013.01)

(58) Field of Classification Search
CPC .................. H01M 4/5825; H01M 10/0525
See application file for complete search history.

(56) References Cited

U.S. PATENT DOCUMENTS

| | | | |
|---|---|---|---|
| 6,013,970 A | 1/2000 | Nishiwaki et al. | |
| 6,046,373 A | 4/2000 | Sun | |
| 2007/0054187 A1 | 3/2007 | Nuspl et al. | |
| 2008/0280141 A1 | 11/2008 | Dobbs et al. | |
| 2009/0117020 A1 | 5/2009 | Manthiram et al. | |
| 2009/0197174 A1 | 8/2009 | Levassbur et al. | |

FOREIGN PATENT DOCUMENTS

| | | |
|---|---|---|
| JP | 2004-079276 A | 3/2004 |
| JP | 2004-259470 A | 9/2004 |
| JP | 2006-040640 A | 2/2006 |
| JP | 2007-011930 A | 1/2007 |
| WO | 2008/077447 A1 | 7/2008 |

(Continued)

OTHER PUBLICATIONS

Chen et al., Hydrothermal synthesis of cathode materials, Jul. 22, 2007, Journal of Power Sources 174 (2007) 442-448.

Manthiram et al., "Nanostructured Electrode Materials for Electrochemical Energy Storage and Conversion," Energy & Environmental Science, pp. 621-638, vol. 1, Sep. 19, 2008.

(Continued)

*Primary Examiner* — Osei K Amponsah
(74) *Attorney, Agent, or Firm* — Oliff PLC (57) ABSTRACT

The present invention provides an active material which can increase the discharge capacity of a lithium-ion secondary battery as compared with the case using conventional LiMnPO$_4$ as a positive electrode active material. The active material in accordance with the present invention contains a crystallite of LiMnPO$_4$, the crystallite having a size of 20 to 93 nm in a direction perpendicular to a (060) plane thereof.

5 Claims, 3 Drawing Sheets

(56) References Cited

FOREIGN PATENT DOCUMENTS

WO      2008/077448 A1      7/2008

OTHER PUBLICATIONS

High Power Lithium Corporation, "Solutions for Next Generation Lithium Batteries," 2009.

Buqa, H., et al., "High Perfomance Nano-Sized LiMnPO4 Synthesized Via a Polyol Method," 2008, High Power Lithium Corporation.

Miners, J.H., et al., "Advances in Li Ion Cathodes for HEV: Lithium Manganese Phosphate," Large Lithium Battery & Applications, May 13, 2008, High Power Lithium Corporation.

Buqa, H., et al., "Manganese Phosphate: New High-Voltage Li-Ion Cathode," 2007, High Power Lithium Corporation.

Li, G. et al., "LiMnPO4 as the Cathode for Lithium Batteries," Electrochemical and Solid-State Letters, 2002, pp. A 135-A 137, vol. 5, No. 6, Published by The Electrochemical Society.

Murugan, A.V. et al., "One-Pot Microwave-Hydrothermal Synthesis and Characterization of Carbon-Coated LiMPO4M=Mn, Fe, and Co) Cathodes," Journal of the Electrochemical Society, 2009, pp. A79-A83, vol. 156, No. 2, Published by The Electrochemical Society.

Aug. 17, 2012 Office Action issued in U.S. Appl. No. 12/784,893.
Jan. 7, 2013 Office Action issued in U.S. Appl. No. 12/784,893.
Apr. 25, 2013 Office Action issued in U.S. Appl. No. 12/784,893.
Nov. 7, 2013 Office Action issued in U.S. Appl. No. 12/784,893.
Jul. 30, 2014 Office Action issued in U.S. Appl. No. 12/784,893.
Sep. 25, 2015 Examiner's Answer issued in U.S. Appl. No. 12/784,893.
Aug. 7, 2017 Decision on Appeal issued in U.S. Appl. No. 12/784,893.

Fig.3 ical and Solid-State Letters, 5(6) A135-A137 (2002)

ACTIVE MATERIAL, METHOD OF MANUFACTURING ACTIVE MATERIAL, AND LITHIUM-ION SECONDARY BATTERY

BACKGROUND OF THE INVENTION

Field of the Invention

The present invention relates to an active material, a method of manufacturing an active material, and Lithium-Ion Secondary Battery.

Related Background Art

Materials having a general formula of $Li_xA_yPO_4$ (where A is Cr, Mn, Fe, Co, Ni, Cu, or the like, $0<x<2$, and $0<y<1$) with an olivine structure can reversibly intercalate and deintercalate lithium ions and thus function as a positive electrode active material of lithium-ion secondary batteries. Since $Li_xA_yPO_4$ is superior to other active materials in terms of safety, its practical utilization has been studied (see Japanese Patent Application Laid-Open Nos. 2004-259470 and 2004-79276).

Using $LiMnPO_4$, in particular in $Li_xA_yPO_4$, as a positive electrode active material yields a high discharge voltage of about 4.1 V versus whereby a high energy density can be expected (see the following prior art literatures).

Japanese Patent Application Laid-Open Nos. 2006-40640 and 2007-119304.

Solution for next generation Lithium batteries. [online]. High Power Lithium Corporation, 2009. [retrieved on 2009 Feb. 18]. Retrieved from the Internet: URL:http://www.highpowerlithium.com/index.php?option=com_content&task=view&id=26&Itemid=57>.

High Performance nano-sized $LiMnPO_4$ synthesized via a Polyol method. [online]. High Power Lithium Corporation, 2008. [retrieved on 2009 Feb. 18]. Retrieved from the Internet: <URL:http://www.highpowerlithium.com/images/stories/HPL_presentation/hpl%20poster%20imlb%202008.pdf>.

Advance in Li Ion cathodes for HEV: Lithium Manganese Phosphate. [online]. High Power Lithium Corporation, 2008. [retrieved on 2009 Feb. 18]. Retrieved from the Internet: <URL:http://www.highpowerlithium.com/images/stories/HPL_presentation/hpl%20llibta%20presentation%202008.pdf>.

Manganese Phosphate: new high-Voltage Li-ion cathode. [online]. High Power Lithium Corporation, 2007, [retrieved on 2009 Feb. 18]. Retrieved from the Internet: <URL:http://www.highpowerlithium,com/images/stories/HPL_presentation/hpl_llibta_2007.pdf>.

Electrochemical and Solid-State Letters, 5(6) A135-A137 (2002)

Journal of The Electrochemical Society, 156(2) A79-A83 (2009)

SUMMARY OF THE INVENTION

Even when $LiMnPO_4$ described in the above-mentioned literatures is used as a positive electrode active material, however, a lithium-ion secondary battery having a discharge capacity large enough for practical use has been hard to achieve.

In view of the problems of the prior art mentioned above, it is an object of the present invention to provide an active material which can increase the discharge capacity of a lithium-ion secondary battery as compared with the case using conventional $LiMnPO_4$ as a positive electrode active material, a method of manufacturing the active material, and lithium-ion secondary battery.

For achieving the above-mentioned object, the active material in accordance with the present invention contains a crystallite of $LiMnPO_4$, the crystallite having a size of 20 to 93 rim in a direction perpendicular to a (060) plane thereof. The lithium-ion secondary battery in accordance with the present invention comprises a positive electrode, the positive electrode has a positive current collector and a positive active material layer disposed on the positive current collector, the positive active material layer contains the active material in accordance with the present invention.

By using the active material in accordance with the present invention as a positive electrode active material, a lithium-ion secondary battery can increase its discharge capacity as compared with the case using conventional $LiMnPO_4$.

Preferably, in the active material in accordance with the present invention, the crystallite has a size of 75 to 210 nm in a direction perpendicular to a (210) plane thereof.

This makes it easier for the lithium-ion secondary battery to increase the discharge capacity remarkably.

The method of manufacturing an active material in accordance with the present invention comprises a hydrothermal synthesis step of irradiating a mixture containing a lithium source, a phosphate source, a manganese source, and water and having a pH of 7 to 9 with an electromagnetic wave, so as to heat the mixture under pressure such that the mixture reaches a crystal growth temperature T of 180° C. or higher.

The method of manufacturing an active material in accordance with the present invention directly heats the solvent and solute of the mixture by irradiation with an electromagnetic wave instead of conventional external heat sources such as thermostatic baths and heating furnaces, and thus can promote the generation and crystal growth of $LiMnPO_4$ in the mixture. By stopping the irradiation with the electromagnetic wave, the method of manufacturing an active material in accordance with the present invention can cool the mixture more rapidly than methods using the conventional external heat sources, and thus is easier to stop the crystal growth of $LiMnPO_4$. Therefore, the method of manufacturing an active material in accordance with the present invention can finely divide the crystallite of $LiMnPO_4$, so as to control the size of the crystallite such that it falls within the range of 20 to 93 nm in a direction perpendicular to a (060) plane thereof.

Preferably, in the method of manufacturing an active material in accordance with the present invention, the crystal growth temperature is 190 to 240° C. in the hydrothermal synthesis step.

By using the active material obtained at the crystal growth temperature T to 190 to 240° C. as a positive electrode active material, the lithium ion secondary battery can remarkably increase the discharge capacity.

Preferably, in the method of manufacturing an active material in accordance with the present invention, the mixture is caused to reach the crystal growth temperature T at a heating rate of 5 to 50° C./min in the hydrothermal synthesis step.

By using the active material obtained at the heating rate of 5 to 50° C./min as a positive electrode active material, the lithium-ion secondary battery can remarkably increase the discharge capacity.

Preferably, after reaching the crystal growth temperature T, the mixture is held at the crystal growth temperature T for 300 min or less by irradiating the mixture with the electromagnetic wave in the hydrothermal synthesis step.

By using thus obtained active material as a positive electrode active material, the lithium-ion secondary battery can remarkably increase the discharge capacity.

The present invention can provide an active material which can increase the discharge capacity of a lithium-ion secondary battery as compared with the case using conventional $LiMnPO_4$ as a positive electrode active material, a method of manufacturing the active material, and a lithium-ion secondary battery.

DESCRIPTION OF THE PREFERRED EMBODIMENTS

Active Material

The active material in accordance with an embodiment of the present invention is constituted by a crystallite of $LiMnPO_4$, while the crystallite has a size of 20 to 93 nm in a direction perpendicular to a (060) plane thereof. The "direction perpendicular to a (060) plane of the crystallite" will be referred to as "(060)-plane direction" hereinafter.

The "size of the crystallite" is an average value of crystallite sizes calculated according to the following Scherrer equation (1) from results of measurement by X-ray diffractometry (XRD):

$$D_{hkl} = (K \cdot \lambda)/(\beta \cos \theta) \quad (1)$$

In equation (1), $D_{hkl}$ is the "size of the crystallite" in a direction perpendicular to an (hkl) plane of the crystallite, K is the Scherrer factor, $\lambda$ is the wavelength of the X-ray used for the XRD, $\beta$ is the spread (half width or integral width) of a diffracted X-ray peak, and $\theta$ is the Bragg angle of the diffracted X-ray. In the following, the size of the crystallite in the (060) plane may also be abbreviated as "$D_{060}$" when appropriate.

In the crystallite of $LiMnPO_4$, lithium ions ($Li^+$ ions) are retained along the (060)-plane direction, so that a conduction path of lithium ions is formed along the (060)-plane direction. The crystallite attains its optimal structure when its size in the (060) plane-direction is 20 to 93 nm. A lithium-ion secondary battery using the crystallite having thus optimized structure as a positive electrode active material yields a discharge capacity greater than that in the case using conventional $LiMnPO_4$.

When $D_{060}$ is less than 20 nm, the amount of lithium ions retained by the crystallite becomes smaller, thereby making it harder to increase the discharge capacity of the lithium-ion secondary battery, As $D_{060}$ increases beyond 70 nm, the lithium ion conductivity tends to decrease gradually in the crystallite. When $D_{060}$ exceeds 93 nm, the lithium ion conductivity remarkably decreases, whereby the discharge capacity of the lithium-ion secondary battery is harder to increase.

$D_{060}$ is preferably 20 to 70 nm, more preferably 53 to 57 nm. In this case, the discharge capacity of the lithium-ion secondary battery tends to increase remarkably.

The size of the crystallite in a direction perpendicular to a (210) plane thereof is preferably 75 to 210 nm, more preferably 140 to 150 nm. In the following, the size of the crystallite in a direction perpendicular to a (210) plane thereof may be abbreviated as "$D_{210}$" when appropriate.

When $D_{210}$ falls within the above-mentioned range, the discharge capacity of the lithium-ion secondary battery tends to increase remarkably as compared with the case where $D_{210}$ is outside of the range. Though the relationship between $D_{210}$ and the discharge capacity is not completely clear, the inventors think that the form of the (060) plane of the crystallite is easier to deform when $D_{210}$ is outside of the above-mentioned range than when not, whereby the crystallite tends to lose its lithium ion retention or conductivity, thus lowering the discharge capacity.

Lithium-Ion Secondary Battery

Figure 3:
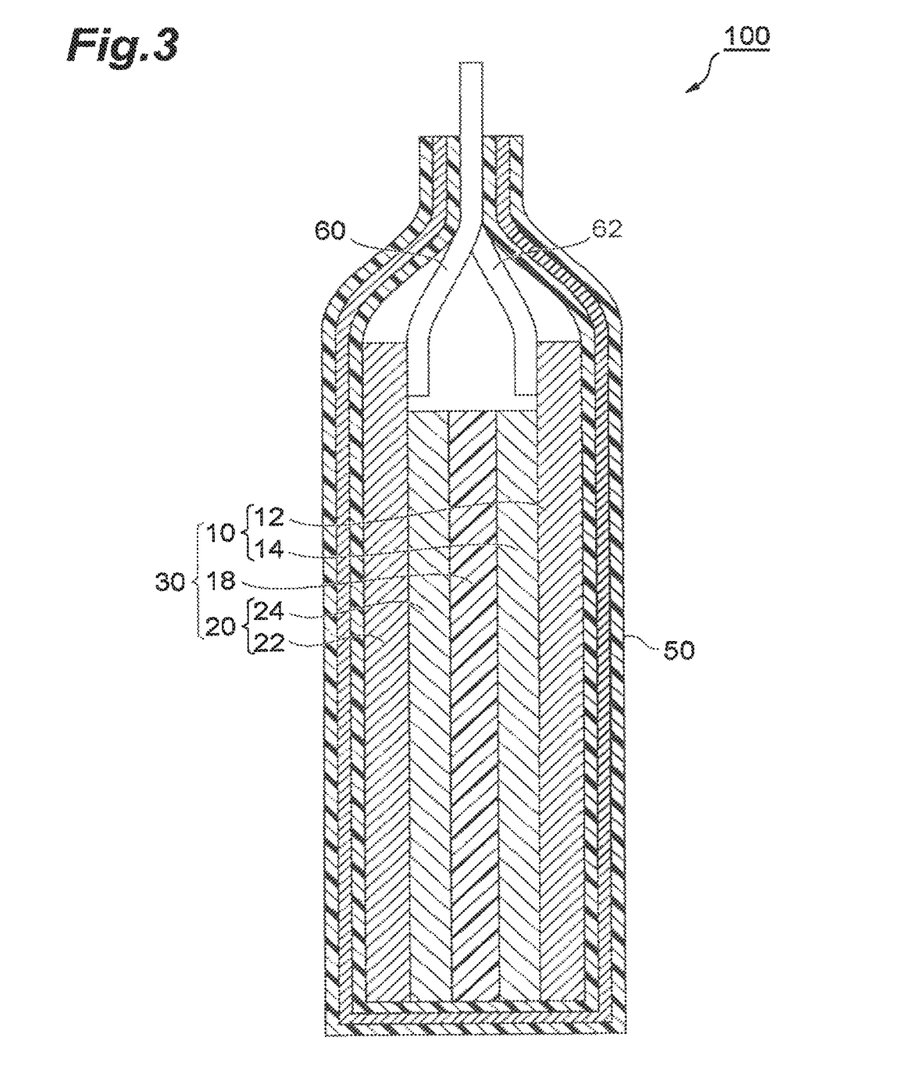
FIG. 3 is a schematic sectional view of a lithium-ion secondary battery comprising a positive active material layer containing an active material in accordance with an embodiment of the present invention.

As illustrated in FIG. 3, The lithium-ion secondary battery 100 in accordance with this embodiment is equipped with a power generating element 30 comprising a planar positive electrode 10 and a planar negative electrode 20 opposing each other and a planar separator 18 disposed between and adjacent to the positive and negative electrodes; an electrolyte containing lithium ions; a case 50 accommodating them in a closed state; a negative electrode lead 62 having one end part electrically connected to the negative electrode 20 and the other end part projecting out of the case 50; and a positive electrode lead 60 having one end part electrically connected to the positive electrode 10 and the other end part projecting out of the case 50.

The negative electrode 20 has a negative electrode current collector 22 and a negative electrode active material layer 24 formed on the negative electrode current collector 22. The positive electrode 10 has a positive electrode current collector 12 and a positive electrode active material layer 14 formed on the positive electrode current collector 12. The separator 18 is placed between the negative electrode active material layer 24 and positive electrode active material layer 14.

The positive electrode active material layer 14 contains the above-mentioned active material in accordance with this embodiment.

Method of Manufacturing Active Material

The method of manufacturing an active material in accordance with an embodiment of the present invention will now be explained. The method of manufacturing an active material in accordance with this embodiment comprises a hydrothermal synthesis step of irradiating a mixture containing a lithium source, a phosphate source, a manganese source, and water and having a pH of 7 to 9 with an electromagnetic wave, so as to heat the mixture under pressure such that the mixture reaches a crystal growth temperature T of 180° C. or higher. The method of manufacturing an active material in accordance with this embodiment can manufacture the active material in accordance with the previous embodiment.

Hydrothermal Synthesis Step

First, in the hydrothermal synthesis step, the above-mentioned lithium source, phosphate source, manganese source, and water are put into a reaction vessel, so as to prepare a mixture (aqueous solution) having them dispersed therein. For preparing the mixture, a mixture of the phosphate source, manganese source, and water may be refluxed at first before adding the lithium source thereto, for example. The reflux can form a complex of the phosphate and manganese sources.

Any reaction vessel may be used as long as it can closely seal the inside thereof and is resistant to heat and pressure. The reaction vessel is constituted by a material having a property of transmitting therethrough an electromagnetic wave such as a microwave or carbon dioxide laser, which will be explained later, without absorbing it. In this embodiment, a reaction vessel made of a fluororesin such as polytetrafluoroethylene may be used, for example.

The pH of the mixture is adjusted to 7 to 9. $D_{O60}$ of the active material becomes greater than 93 nm and smaller than 20 nm when the pH of the mixture is too small and too large, respectively.

While various methods can be employed for adjusting the pH of the mixture to 7 to 9, adding an acidic or basic reagent to the mixture is preferred. Hydrochloric acid or the like may be used as the acidic reagent, while aqueous ammonia solution or the like may be used as the basic reagent. The amount of the acidic or basic reagent to be added may be adjusted appropriately according to the amount of the mixture and the kinds and compounding ratios of the lithium, phosphate, and manganese sources, As the lithium source, at least one species selected from the group consisting of $LiNO_3$, $Li_2CO_3$, $LiCl$, $Li_2SO_4$, and $CH_3COOLi$ may be used, for example.

As the phosphate source, at least one species selected from the group consisting of $H_3PO_4$, $NH_4H_2PO_4$, $(NH_4)_2HPO_4$ and $Li_3PO_4$ may be used, for example.

As the manganese source, at least one species selected from the group consisting of $MnSO_4.5H_2O$, $Mn\ CO_3$, and $Mn(CH_3COO)_2.4H_2O$ may be used, for example.

Two or more kinds of lithium sources, two or more kinds of phosphate sources, and two or more kinds of manganese sources may be used together.

Next, the reaction vessel is closed, and the mixture within the reaction vessel begins to be irradiated with an electromagnetic wave. The electromagnetic wave passes through the reaction vessel, so as to reach the mixture. The electromagnetic wave causes an oscillating electromagnetic field which stimulates water, the lithium source, the phosphate source, or the manganese source to rotate or vibrate, thereby heating the mixture. This generates a vapor within the reaction vessel, which increases the pressure within the reaction vessel, thereby pressurizing the mixture. The mixture is continuously irradiated with the electromagnetic wave at least until the mixture reaches the crystal growth temperature T. As a consequence, the hydrothermal synthesis of the above-mentioned active material in accordance with this embodiment proceeds in the mixture.

Unlike methods indirectly heating the mixture within the reaction vessel by using external heat sources such as thermostatic baths and heating furnaces, the method of manufacturing an active material in accordance with this embodiment directly heats the mixture with an electromagnetic wave whose output and irradiation time can be adjusted freely. Therefore, as compared with the cases using external heat sources, this embodiment can substantially neglect influences of the thermal conduction and convection, so as to make it possible to heat and cool the mixture rapidly and uniformly and easy to control the temperature of the mixture. By heating the mixture rapidly and uniformly, this embodiment can promote the hydrothermal synthesis and crystal growth of $LiMnPO_4$. Cooling the mixture rapidly and uniformly can suppress excessive crystal growth, thereby making it possible to control the crystallite of $LiMnPO_4$ such that its $D_{O60}$ falls within the range of 20 to 93 ran. Heating the mixture within the reaction vessel by using the conventional thermostat bath or heating furnace is harder to control the temperature of the mixture than the present invention, whereby the crystallite of $LiMnPO_4$ may grow in excess so that its $D_{O60}$ exceeds 93 nm, for example.

Any electromagnetic wave may be used as long as it has a frequency which passes through the reaction vessel and stimulates at least one of water and the lithium, phosphate, and manganese sources in the mixture to rotate or vibrate. Specific examples of the electromagnetic wave include microwaves, lasers, and infrared rays, among which a microwave or laser is preferably used. The microwave may have a frequency of 2.45 GHz or 915 MHz, for example. The microwave having such a frequency is suitable for heating water in particular. As the laser, a carbon dioxide laser ($CO_2$ laser) may be used, for example. The mixture within the reaction vessel may be irradiated with the electromagnetic wave by using a commercially available electromagnetic irradiation apparatus such as a microwave irradiation apparatus or carbon dioxide laser irradiation apparatus.

In the hydrothermal synthesis step, the crystal growth temperature T is adjusted to 180° C. or higher. Preferably, the crystal growth temperature T is controlled so as to fall within the range of 190 to 240° C. When the crystal growth temperature T is lower than 180° C., the active material is easier to lower its crystallinity, whereby its $D_{O60}$ may be less than 20 nm. As a result, the discharge capacity of the lithium-ion secondary battery becomes smaller than that in the case where the crystal growth temperature T falls within the range mentioned above. When the crystal growth temperature T is too high, $D_{O60}$ tends to become so large that the discharge capacity of the lithium-ion secondary battery may decrease.

Preferably, the mixture is caused to reach the crystal growth temperature T at a heating rate of 5 to 50° C./min in the hydrothermal synthesis step. When the heating rate is outside of the range of 5 to SVC/min, the discharge capacity of the lithium-ion secondary battery tends to become lower than that in the case where the heating rate falls within the range of 5 to 50'C./min. Using a pulsed wave as the electromagnetic wave makes it easier to control the heating rate.

Preferably, after reaching the crystal growth temperature T, the mixture is held at the crystal growth temperature T for 300 min or less by irradiating the mixture with the electromagnetic wave. In other words, it will be preferred if the irradiation of the mixture with the electromagnetic wave is stopped within 300 min from the time when the mixture reaches the crystal growth temperature T by irradiating the mixture with the electromagnetic wave. The time elapsed since the mixture reached the crystal growth temperature T by irradiating the mixture with the electromagnetic wave until the irradiation of the mixture held at the crystal growth temperature T with the electromagnetic wave is stopped will be referred to as "time t" in the following.

When the time t is longer than 300 min, $D_{O60}$ tends to become greater than that in the case where the time t is 300 min or less, thereby decreasing the discharge capacity.

The time t may be 0 min. That is, the irradiation of the mixture with the electromagnetic wave may be stopped at the time when the mixture reaches the crystal growth temperature T. For example, "0 min" can be defined as the time elapsed since a CPU determined that the mixture reached the crystal growth temperature T in an electromagnetic irradiation apparatus for controlling the temperature of the mixture by using the CPU until an output power supply for the electromagnetic wave is actually turned off in response to an instruction to turn off the output power supply from the CPU.

The pressure applied to the mixture (the internal pressure of the reaction vessel) in the hydrothermal step, which is uniquely determined by the temperature of the aqueous solution (mixture), is preferably adjusted to 0.2 to 6 MPa. When the pressure applied to the mixture is too low, the finally obtained active material tends to lower its crystallinity, thereby reducing the capacity density of the active material and the discharge capacity of the lithium-ion secondary battery. When the pressure applied to the mixture is too high, the reaction vessel tends to require excessive resistance to pressure, thereby increasing the cost for manufacturing the active material. These tendencies can be suppressed when the pressure applied to the mixture falls within the range mentioned above, The pressure within the reaction vessel can be measured by a pressure sensor provided with the commercially available electromagnetic irradiation apparatus and controlled by an automatic pressure control system, for example.

Heat-Treatment Step

Preferably, the mixture after the hydrothermal synthesis step is heat-treated in this embodiment. This can promote the reaction of the lithium, phosphate, and manganese sources that failed to react in the hydrothermal synthesis step and the crystal growth of $LiMnPO_4$ that has not grown the crystal sufficiently.

The heat-treatment temperature is preferably 400 to 800° C. When the heat-treatment temperature is too low, the crystal growth of $LiMnPO_4$ tends to become insufficient, thereby lowering the capacity density of the active material. When the heat-treatment temperature is too high, the crystal growth of $LiMnPO_4$ tends to proceed in excess, so as to increase $D_{060}$, thereby making it harder to increase the discharge capacity of the lithium-ion secondary battery. These tendencies can be suppressed when the heat-treatment temperature falls within the range mentioned above.

Preferably, the heat-treatment time for the mixture is 0.5 to 20 hr. Preferably, the mixture is heat-treated in a nitrogen, argon, air, or vacuum atmosphere.

The mixture obtained by the hydrothermal synthesis step may be heated for about 1 to 30 hr at about 60 to 150° C. before being heat-treated. This heating removes impurities such as surplus moisture and organic solvents from the mixture, thereby turning the mixture into a dry powder. Heat-treating the dried mixture can prevent the active material from taking impurities therein and homogenize particle forms, Preferably, a carbon source or carbon particle is added to the mixture after the hydrothermal synthesis step before the heat treatment. This allows at least a part of the active material surface to carry the carbon material. As a result, the electrical conductivity of thus obtained active material can be improved. The carbon source or carbon particle may be added before the hydrothermal synthesis step.

Examples of substances constituting the carbon particle include activated carbon, carbon black, graphite, hard carbon, and soft carbon, among which carbon black is preferably used. This makes it easier to improve the electrical conductivity of the active material. Using acetylene black as carbon black makes it easier to improve the electrical conductivity of the active material.

While preferred embodiments of the active material and method of manufacturing the active material have been explained in the foregoing, the present invention is not limited thereto.

For example, the active material of the present invention can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing the active material of the present invention as an cathode and a metallic lithium or a lithium alloy such as lithium aluminum as an anode), and electrochemical capacitors such as lithium capacitors. These electrochemical devices can be used for power supplies for self-propelled micromachines, IC cards, and the like and decentralized power supplies placed on or within printed boards.

EXAMPLES

The present invention will now be explained more specifically with reference to examples and comparative examples, but will not be limited to the following examples.

Example 1

Hydrothermal Synthesis Step $LiOH.H_2O$, $(NH_4)_2HPO_4$, and $MnSO_4.5H_2O$ were dissolved in water and mixed, so as to prepare an aqueous solution. The respective concentrations of $LiOH.H_2O$, $(NH_4)_2HPO_4$, and $MnSO_4.5H_2O$ were adjusted to 0.3 M, 0.1 M, and 0.1 M. Water used was not subjected to any deaeration operation such as removal of dissolved oxygen in particular. The pH of the aqueous solution was 9.5. Concentrated hydrochloric acid was added dropwise to the aqueous solution, so as to adjust the pH of the aqueous solution to 8.0. Subsequently, the aqueous solution was left for 2 days in the air. Oxygen in the aqueous solution and oxygen in the air were presumed to have oxidized $Mn^{2+}$ in the solution gradually during the 2 days.

After being left for the 2 days, the aqueous solution was sealed closely in a pressure-resistant vessel made of polytetrafluoroethylene. Then, using a commercially available microwave irradiation apparatus, the aqueous solution within the pressure-resistant vessel began to be irradiated with a microwave. The irradiation with the microwave generated steam within the pressure-resistant vessel, so as to pressurize the aqueous solution and cause it to reach a crystal growth temperature T. The microwave had the maximum output of 1000 W and a frequency of 2.45 GHz. The crystal growth temperature T was adjusted to 190° C. The microwave was emitted in pulses. The hydrothermal synthesis step using the microwave will be referred to as "microwave hydrothermal synthesis step" hereinafter.

In the microwave hydrothermal synthesis step, the heating rate at which the aqueous solution was caused to reach the crystal growth temperature T was adjusted to 10° C./min. The time t elapsed since the aqueous solution was caused to reach the crystal growth temperature T by being irradiated with the microwave until the irradiation of the aqueous solution with the electromagnetic wave was stopped after continuously holding the aqueous solution at the crystal growth temperature T was 5 min. That is, the microwave irradiation was stopped after the aqueous solution having reached the crystal growth temperature T was continuously kept at the crystal growth temperature T for 5 min.

After stopping the irradiation with the microwave, the aqueous solution was naturally cooled to 160° C. in the microwave irradiation apparatus. After being naturally cooled, the pressure-resistant vessel was taken out of the apparatus and cooled with water.

Analysis by Powder X-ray Diffractometry

The liquid taken out of the water-cooled pressure-resistant vessel was filtered and washed with water, so as to yield the active material of Example 1, which was then dried at 80° C. The dried active material was analyzed by the powder X-ray diffractometry (XRD). As a result of the analysis, it was seen that $LiMnPO_4$ was generated alone by the microwave hydrothermal synthesis step in Example 1. $D_{060}$ and $D_{210}$ of $LiMnPO_4$ were also measured, Table 1 represents the results.

Heat-Treatment Step

For 1 hr, $LiMnPO_4$ of Example 1 obtained by the hydrothermal synthesis step and carbon black (manufactured by Denki Kagaku Kogyo K.K. under the product name of DAB-50) were subjected to alternating steps of mixing and milling them at 550 rpm for 1 min and stopping mixing and pulverizing them for 1 min, so as to prepare a positive electrode material. The mixing ratio between $LiMnPO_4$ and carbon black was adjusted such that $LiMnPO_4$ carbon black=80 parts by mass: 10 parts by mass. For mixing and milling, a planetary ball mill manufactured by Retsch GmbH (type: PM-100) was used. Zirconia balls were used as media for mixing and milling. The mixed and milled positive electrode material was heat-treated in an argon gas flow. In the heat treatment, the temperature of the positive electrode material was raised to 700° C. in 1 hr, held at 700° C. for 1 hr, and then naturally cooled to room temperature.

Making of a Half Cell

A positive electrode coating material was prepared by adding 90 parts by mass of the heat-treated positive electrode material and 10 parts by mass of PVDF (polyvinylidene fluoride) to NMP (N-methyl-2-pyrrolidone). The ratios of $LiMnPO_4$, carbon black, and PVDF, which were solids in the positive electrode coating material, were adjusted such that $LiMnPO_4$:carbon black:PVDF 80 parts by mass:10 parts by mass:10 parts by mass.

The positive electrode coating material was applied to an aluminum foil having a thickness of 20 μm. The applied positive electrode coating material was dried and then pressed under pressure, so as to yield a positive electrode. Subsequently, a Li foil was cut into a predetermined size, which was then attached to a copper foil (having a thickness of 15 μm), so as to yield a negative electrode. The positive and negative electrodes were laminated with a separator made of a macroporous polyethylene film interposed therebetween, so as to yield a multilayer body (matrix). As outer lead terminals, an aluminum foil (4 mm (W)×40 mm (L)×80 μm (T)) and a nickel foil (4 mm (W)×40 mm (L)×80 μm (T)) were ultrasonically welded to the positive and negative electrodes, respectively, Polypropylene (PP) having grafted with maleic anhydride beforehand was wound about and thermally bonded to each of the outer lead terminals. This aims to improve the sealability between each outer terminal and an outer package. Prepared as the outer package of the battery was one made of an aluminum laminate material having a structure of PET(12)/Al(40)/PP(50). PET and PP refer to polyethyleneterephthalate and polypropylene, respectively. The parenthesized numbers represent thicknesses of their corresponding layers. Here, an envelope was made such that PP faces the inside. Thus obtained multilayer body was put into the outer package of the battery, 1-M $LiPF_6$/EC+DEC (with a volume ratio of 30:70) was injected therein, and the outer package of the battery was heat-sealed in vacuum, so as to make an electrode evaluation half cell of Example 1.

Measurement of the Discharge Capacity

Using the half cell of Example 1, the discharge capacity (unit: mAh/g) at a discharge rate of 0.1 C (the current value by which constant-current discharging completed in 10 hr) was measured, Table 1 represents the measured results. The discharge capacity represented in Table 1 was the discharge capacity per gram of the active material. In the measurement, assuming that $LiMnPO_4$ as the positive electrode active material had a nominal capacity of 171 mAh/g, the charging and discharging was carried out at 0.1 C. The upper charge voltage and the tower discharge voltage were set to 4.5 V (vs. $Li/Li^+$) and 2.0 V (vs. $Li/Li^+$), respectively. The charging was effected until the positive electrode reached the upper charge voltage and the charge current decayed to 1/20 C. The measurement temperature was 25° C.

Examples 2 to 24 and 27 to 34

Figure 1:
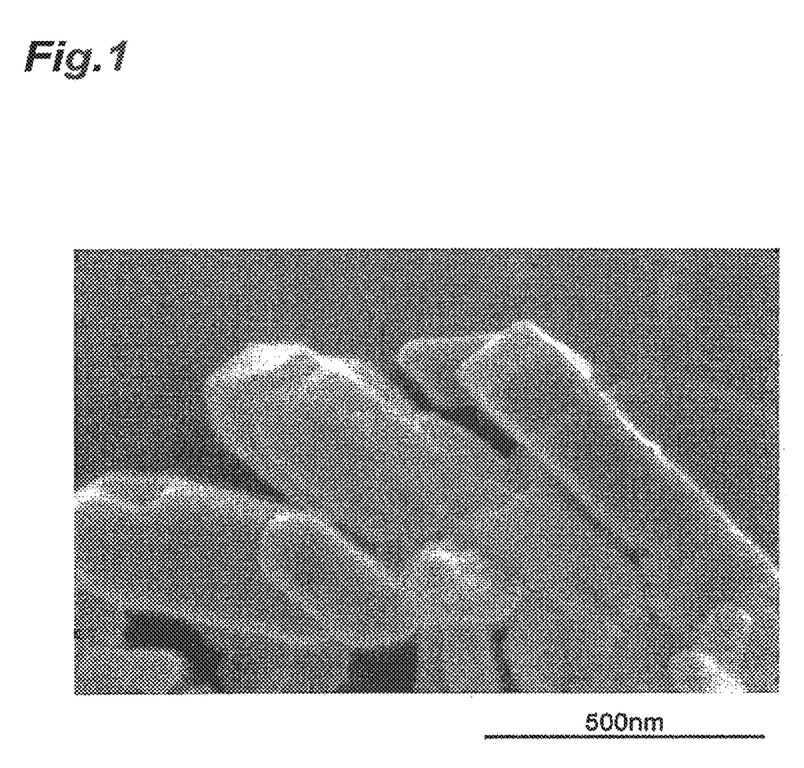
FIG. 1 is a photograph of the active material of Example 22 in the present invention captured through a scanning electron microscope (SEM).

The active materials and half cells of Examples 2 to 24 and 27 to 34 were made as in Example 1 except that the crystal growth temperature T, heating rate, and time t in the microwave hydrothermal synthesis step were adjusted to their corresponding values listed in Table 1. As a result of the analysis by XRD, it was seen that the microwave hydrothermal synthesis step generated $LiMnPO_4$ alone as an active material in each of Examples 2 to 24 and 27 to 34, too. FIG. 1 illustrates a photograph of $LiMnPO_4$ of Example 22 taken through an SEM.

Example 25

In Example 25, the microwave hydrothermal synthesis step was carried out with the aqueous solution whose pH was adjusted to 7.0 by adding concentrated hydrochloric acid dropwise thereto. The crystal growth temperature T, heating rate, and time t in the microwave hydrothermal synthesis step in Example 25 were adjusted to their corresponding values listed in Table 1. Except for these matters, the active material and half cell of Example 25 were made as in Example 1. As a result of the analysis by XRD, it was seen that the microwave hydrothermal synthesis step generated $LiMnPO_4$ alone as an active material in Example 25, too.

Examples 26 and 36

Figure 2:
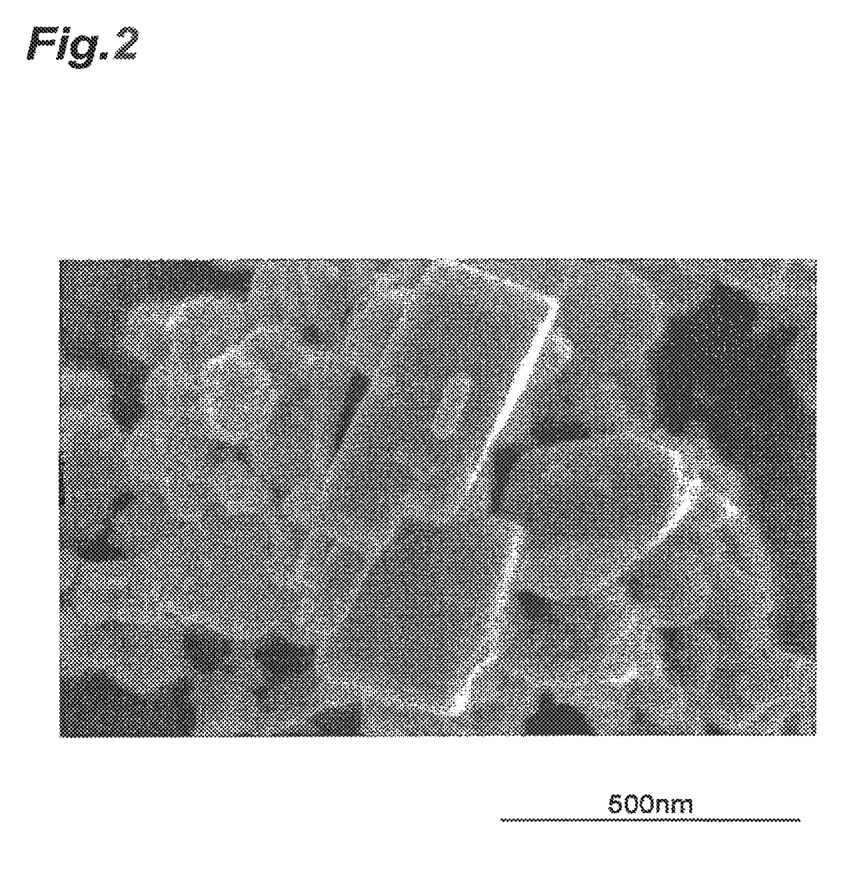
FIG. 2 is a photograph of the active material of Example 26 in the present invention captured through the scanning electron microscope (SEM).

In Examples 26 and 36, the microwave hydrothermal synthesis step was carried out with the aqueous solution whose pH was adjusted to 9.0 by adding concentrated hydrochloric acid dropwise thereto. The crystal growth temperature T, heating rate, and time t in the microwave hydrothermal synthesis step in Examples 26 and 36 were adjusted to their corresponding values listed in Table 1. Except for these matters, the active materials and half cells of Examples 26 and 36 were made as in Example 1. As a result of the analysis by XRD, it was seen that the microwave hydrothermal synthesis step generated $LiMnPO_4$ alone as an active material in Examples 26 and 36, too. FIG. 2 illustrates a photograph of $LiMnPO_4$ of Example 26 taken through the SEM.

Example 35

In the hydrothermal synthesis step, Example 35 used a carbon dioxide gas laser instead of the microwave (1 kW at CW), and an autoclave made of stainless steel instead of the pressure-resistant vessel made of polytetrafluoroethylene. The crystal growth temperature T, heating rate, and time t in the microwave hydrothermal synthesis step in Example 35 were adjusted to their corresponding values listed in Table 1. Except for these matters, the active material and half cell of Example 35 were made as in Example 1. As a result of the analysis by XRD, it was seen that the microwave hydrothermal synthesis step generated $LiMnPO_4$ alone as an active material in Example 35, too.

Comparative Example 1

In Comparative Example 1, the microwave hydrothermal synthesis step was carried out with the aqueous solution whose pH was adjusted to 6.5 by adding concentrated hydrochloric acid dropwise thereto. The crystal growth temperature T, heating rate, and time t in the microwave hydrothermal synthesis step in Comparative Example 1 were adjusted to their corresponding values listed in Table 1. Except for these matters, the active material and half cell of Comparative Example 1 were made as in Example 1. As a result of the analysis by XRD, it was seen that $Mn_5(PO_3(OH))_2(PO_4)_2(H_2O)_4$ was generated as an impurity in addition to $LiMnPO_4$ in the active material of Comparative Example 1.

Comparative Example 2

In Comparative Example 2, no concentrated hydrochloric acid was added dropwise to the aqueous solution before carrying out the microwave hydrothermal synthesis step. That is, Comparative Example 2 carried out the microwave hydrothermal synthesis step by using the aqueous solution whose pH was 9.5. The crystal growth temperature T, heating rate, and time t in the microwave hydrothermal synthesis step in Comparative Example 2 were adjusted to their corresponding values listed in Table 1. Except for these matters, the active material and half cell of Comparative Example 2 were made as in Example 1. As a result of the analysis by XRD, it was seen that $Mn_5(PO_3(OH))_2(PO_4)_2(H_2O)_4$ and $Li_{0.48}Mn_{0.89}O_2$ were generated as impurities in addition to $LiMnPO_4$ in the active material of Comparative Example 2.

Comparative Example 3

Comparative Example 3 carried out the hydrothermal synthesis step by heating an autoclave made of stainless steel closely sealing the aqueous solution therein in a thermostat bath. The crystal growth temperature T, heating rate, and time t in the hydrothermal synthesis step in Comparative Example 3 were adjusted to their corresponding values listed in Table 1. Except for these matters, the active material and half cell of Comparative Example 3 were made as in Example 1. As a result of the analysis by XRD, it was seen that the microwave hydrothermal synthesis step generated $LiMnPO_4$ alone as an active material in Comparative Example 3, too.

Comparative Example 4

The active material and half cell of Comparative Example 4 were made as in Example 1 except that the crystal growth temperature T in the microwave hydrothermal synthesis step was adjusted to the value represented in Table 1. As a result of the analysis by XRD, it was seen that the microwave hydrothermal synthesis step generated $LiMnPO_4$ alone as an active material in Comparative Example 4, too.

$D_{060}$ and $D_{210}$ of $LiMnPO_4$ and the discharge capacity per gram of the active material were determined in each of Examples 2 to 36 and Comparative Examples 1 to 4 as in Example 1. Table 1 lists the results.

TABLE 1

| | pH | Heating means | Crystal growth temp. T (° C.) | Heating rate (° C./min) | Time t (min) | $D_{060}$ (nm) | $D_{210}$ (nm) | Discharge capacity (mAh/g) |
|---|---|---|---|---|---|---|---|---|
| Example 1 | 8.0 | microwave | 190 | 10 | 5 | 20 | 132 | 132 |
| Example 2 | 8.0 | microwave | 190 | 10 | 0 | 20 | 128 | 130 |
| Example 3 | 8.0 | microwave | 190 | 10 | 60 | 20 | 133 | 135 |
| Example 4 | 8.0 | microwave | 190 | 10 | 300 | 21 | 135 | 136 |
| Example 5 | 8.0 | microwave | 200 | 10 | 0 | 30 | 131 | 132 |
| Example 6 | 8.0 | microwave | 200 | 10 | 5 | 31 | 133 | 134 |
| Example 7 | 8.0 | microwave | 200 | 10 | 60 | 33 | 136 | 134 |
| Example 8 | 8.0 | microwave | 200 | 10 | 300 | 35 | 140 | 135 |
| Example 9 | 8.0 | microwave | 210 | 10 | 0 | 39 | 135 | 133 |
| Example 10 | 8.0 | microwave | 210 | 10 | 5 | 40 | 137 | 134 |
| Example 11 | 8.0 | microwave | 210 | 10 | 60 | 42 | 139 | 135 |
| Example 12 | 8.0 | microwave | 210 | 10 | 300 | 44 | 143 | 136 |
| Example 13 | 8.0 | microwave | 220 | 10 | 0 | 50 | 138 | 135 |
| Example 14 | 8.0 | microwave | 220 | 10 | 5 | 52 | 140 | 136 |
| Example 15 | 8.0 | microwave | 220 | 10 | 60 | 53 | 143 | 137 |
| Example 16 | 8.0 | microwave | 220 | 10 | 300 | 56 | 148 | 136 |
| Example 17 | 8.0 | microwave | 230 | 10 | 0 | 52 | 140 | 138 |
| Example 18 | 8.0 | microwave | 230 | 10 | 5 | 53 | 141 | 139 |
| Example 19 | 8.0 | microwave | 230 | 10 | 60 | 53 | 145 | 140 |
| Example 20 | 8.0 | microwave | 230 | 10 | 300 | 55 | 147 | 140 |
| Example 21 | 8.0 | microwave | 240 | 10 | 0 | 53 | 142 | 140 |
| Example 22 | 8.0 | microwave | 240 | 10 | 5 | 54 | 144 | 142 |
| Example 23 | 8.0 | microwave | 240 | 10 | 60 | 54 | 146 | 143 |
| Example 24 | 8.0 | microwave | 240 | 10 | 300 | 57 | 150 | 143 |
| Example 25 | 7.0 | microwave | 220 | 10 | 60 | 90 | 200 | 130 |
| Example 26 | 9.0 | microwave | 220 | 10 | 60 | 20 | 80 | 135 |
| Example 27 | 8.0 | microwave | 180 | 10 | 300 | 20 | 75 | 120 |
| Example 28 | 8.0 | microwave | 250 | 10 | 0 | 93 | 205 | 123 |
| Example 29 | 8.0 | microwave | 220 | 10 | 315 | 91 | 210 | 121 |
| Example 30 | 8.0 | microwave | 220 | 3 | 5 | 55 | 215 | 110 |
| Example 31 | 8.0 | microwave | 220 | 5 | 5 | 53 | 172 | 121 |
| Example 32 | 8.0 | microwave | 220 | 20 | 5 | 50 | 138 | 131 |

TABLE 1-continued

| | pH | Heating means | Crystal growth temp. T (° C.) | Heating rate (° C./min) | Time t (min) | $D_{060}$ (nm) | $D_{210}$ (nm) | Discharge capacity (mAh/g) |
|---|---|---|---|---|---|---|---|---|
| Example 33 | 8.0 | microwave | 220 | 50 | 5 | 50 | 135 | 124 |
| Example 34 | 8.0 | microwave | 220 | 54 | 5 | 48 | 121 | 115 |
| Example 35 | 8.0 | $CO_2$ laser | 220 | 10 | 60 | 50 | 140 | 135 |
| Example 36 | 9.0 | microwave | 180 | 50 | 300 | 20 | 70 | 110 |
| Comparative Example 1 | 6.5 | microwave | 220 | 10 | 60 | 101 | 228 | 100 |
| Comparative Example 2 | 9.5 | microwave | 220 | 10 | 60 | 10 | 58 | 105 |
| Comparative Example 3 | 8.0 | thermostat bath | 220 | — | 60 | 200 | 300 | 80 |
| Comparative Example 4 | 8.0 | microwave | 170 | 10 | 0 | 15 | 100 | 100 |

As Table 1 represents, by irradiating the aqueous solution having a pH of 7 to 9 with the microwave or carbon dioxide laser, each of Examples 1 to 36 carried out the hydrothermal synthesis step of heating the aqueous solution under pressure such that the aqueous solution reached the crystal growth temperature T of 180° C. or higher. As a result, it was seen that Examples 1 to 36 yielded the active materials each containing a crystallite of $LiMnPO_4$ and exhibiting $D_{060}$ of 20 to 93 nm in $LiMnPO_4$ by the hydrothermal synthesis step.

In Examples 1 to 36 each containing a crystallite of $LiMnPO_4$ and exhibiting $D_{060}$ of 20 to 93 nm in $LiMnPO_4$, the discharge capacity per gram of the active material was seen to be greater than that in any of the comparative examples.

Comparative Example 1 carrying out the microwave hydrothermal synthesis step by using the aqueous solution having a pH of less than 7 was seen to yield $D_{060}$ greater than 93 nm and a discharge capacity smaller than that in any of the examples.

Comparative Example 2 carrying out the microwave hydrothermal synthesis step by using the aqueous solution having a pH exceeding 9 was seen to yield $D_{060}$ falling short of 20 nm and a discharge capacity smaller than that in any of the examples.

Comparative Example 3 carrying out the hydrothermal synthesis step by heating the autoclave made of stainless steel closely sealing the aqueous solution therein in the thermostat bath instead of using the microwave was seen to yield $D_{060}$ greater than 93 nm and a discharge capacity smaller than that in any of the examples.

Comparative Example 4 setting the crystal growth temperature T in the microwave hydrothermal synthesis step to less than 180° C. was seen to yield $D_{060}$ falling short of 20 nm and a discharge capacity smaller than that in any of the examples.

Comparing Examples 4 and 27 with each other and Examples 21 and 28 with each other proved that adjusting the crystal growth temperature T to 190 to 240° C. yielded the discharge capacity greater than that in the case where the crystal growth temperature T was outside of the range of 190 to 240° C.

Comparing Examples 30 to 34 with each other proved that the heating rate of 5 to 50° C./min yielded the discharge capacity greater than that in the case where the heating rate was outside of the range of 5 to 50° C./min.

Comparing Examples 16 and 29 with each other proved that the time t of 300 min or less reduced $D_{060}$ and increased the discharge capacity as compared with the case where the time t was longer than 300 min.

REFERENCE SIGNS LIST

10 . . . positive electrode; 20 . . . negative electrode; 12 . . . positive electrode current collector; 14 . . . positive electrode active material layer; 18 . . . separator; 22 . . . negative electrode current collector; 24 . . . negative electrode active material layer; 30 . . . multilayer body; 50 . . . case; 60, 62 . . . lead; 100 . . . lithium-ion secondary battery

What is claimed is:

1. An active material containing a crystallite of $LiMnPO_4$ having an anisotropic structure, the crystallite having a size of 20 to 93 nm in a direction perpendicular to a (060) plane thereof, and a size of 75 to 210 nm in a direction perpendicular to a (210) plane thereof.

2. A lithium-ion secondary battery comprising a positive electrode, wherein
   the positive electrode has a positive current collector and a positive active material layer disposed on the positive current collector, and
   the positive active material layer contains the active material according to claim 1.

3. A method of manufacturing an active material, the method comprising:
   a hydrothermal synthesis step of irradiating a mixture containing a lithium source, a phosphate source, a manganese source, and water and having a pH of 7 to 9 with an electromagnetic wave, so as to heat the mixture under pressure such that the mixture reaches a crystal growth temperature T of 180° C. or higher,
   wherein the mixture is caused to reach the crystal growth temperature T at a heating rate of 5 to 50°C./min in the hydrothermal synthesis step.

4. A method of manufacturing an active material according to claim 3, wherein the crystal growth temperature T is 190 to 240° C. in the hydrothermal synthesis step.

5. A method of manufacturing an active material according to claim 3, wherein, after reaching the crystal growth temperature T, the mixture is held at the crystal growth temperature T for 300 min or less by irradiating the mixture with the electromagnetic wave in the hydrothermal synthesis step.

* * * * *